J. W. MATTHEWS.
SHOCK ABSORBER.
APPLICATION FILED DEC. 9, 1914.

1,214,343. Patented Jan. 30, 1917.

Witnesses
C. R. Beall.
Rob. Meyer.

Inventor
J. W. Matthews.
By
Attorney

UNITED STATES PATENT OFFICE.

JOHN W. MATTHEWS, OF MACON, MISSOURI.

SHOCK-ABSORBER.

1,214,343.   Specification of Letters Patent.   Patented Jan. 30, 1917.

Application filed December 9, 1914. Serial No. 876,319.

*To all whom it may concern:*

Be it known that I, JOHN W. MATTHEWS, a citizen of the United States, residing at Macon, in the county of Macon and State of Missouri, have invented certain new and useful Improvements in Shock-Absorbers; and I do hereby declare the following to be a full, clear, and exact description of the invention, such as will enable others skilled in the art to which it appertains to make and use the same.

This invention relates to shock absorbers and the primary object of the invention is to provide a pneumatic shock absorber embodying a plurality of cylinders connected one to the other, which cylinders are provided for retaining therein compressed air for cushioning the vehicle or movable body upon which they are mounted.

Another object of this invention is to interpose a valve in the connection between the cylinders, whereby any one of the cylinders may be used independently of the other for exercising its cushioning proclivities.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1:
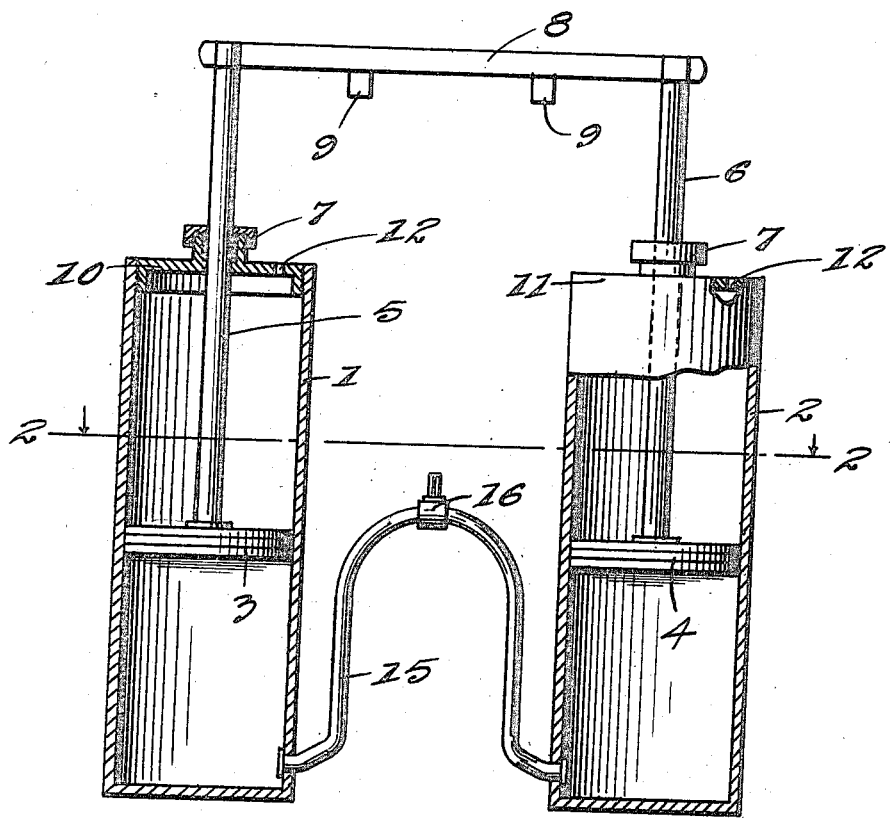
Figure 2:
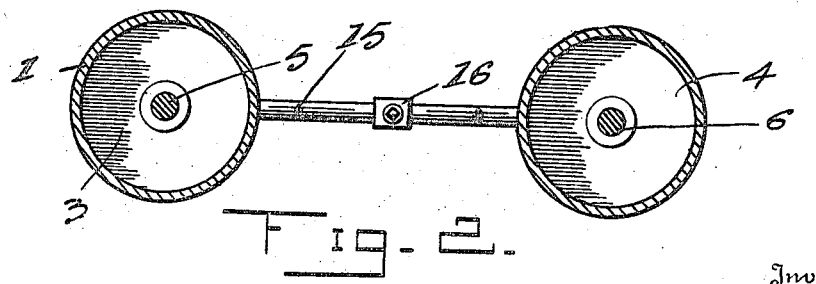

Figure 1 is a view partially in side elevation and partially in section through the improved shock absorber, and Fig. 2 is a sectional view on the line 2—2 of Fig. 1.

Referring more particularly to the drawings, 1 and 2 designate cylinders, which have pistons 3 and 4 mounted therein respectively.

The pistons 3 and 4 are slidably mounted within the cylinders 1 and 2 in fluid tight connection with the bores of the cylinders and they have piston rods 5 and 6 connected thereto respectively. The piston rods 5 and 6 extend upwardly out through the upper end of the cylinders 1 and 2 and pass through stuffing boxes 7 which are connected to the upper ends of the cylinders. The piston rods 5 and 6 have their upper terminal ends connected for synchronous movement with each other, by a cross bar 8, which cross bar has lugs 9 formed upon its under surface. The lugs 9 are provided for attaching the cross bar 8 to a vehicle spring or the chassis of a vehicle such as a "Ford" automobile. The upper ends 10 and 11 of the cylinders 1 and 2 have openings 12 formed therein, which communicate with the interior of the cylinders above the surface of the pistons 3 and 4 and are provided for permitting the outlet of air out of the cylinders upon the upward movement of the pistons. The cylinders 1 and 2 are connected adjacent their lower ends, and below the pistons 3 and 4 by a pipe 15 which is bent to assume substantially a U-shape as is clearly shown in Fig. 1 of the drawings, and by the provision of this pipe which communicatedly connects the two cylinders, the uniform air pressure is maintained within the cylinders to render the operation of the pistons 3 and 4 uniform. A valve construction 16 is positioned in the pipe 15. The valve 16 is of the ordinary type of valve used for inflating inflatable bodies, and it is provided for forcing air into the lowest portions of the cylinders beneath the pistons 3 and 4 to permit of the outlet of air from this portion of the cylinders.

The spaces contained within the cylinders above the pistons 3 and 4 are provided for absorbing the rebound occasioned by the traveling of the vehicle over rough roads.

In the operation of the improved shock absorber heretofore described: the cylinders 1 and 2 are filled with compressed air, of sufficient amount to support the weight on the vehicle upon which they are to be mounted, and this compressed air is forced inwardly into the cylinders beneath the inner under surfaces of the pistons 3 and 4, and the air cushion thus formed, will resiliently support the vehicle and permit of a limited cushioning movement of the pistons 3 and 4, by acting upon the compressed air contained in the cylinders.

If it is so desired the piston rods 5 and 6 may be pivotally connected to the cross bar 8 for permitting of a limited amount of movement of either of the pistons independent of the other.

In reducing the invention to practice certain minor features of construction, combination and arrangement of parts may necessitate alterations to which the patentee is entitled provided such alterations are comprehended within the scope of what is claimed.

What is claimed is:—

A vehicle shock absorber including a pair of vertical cylinders designed to be located in advance and rear of the axle of a vehicle and to be rigidly secured to the same, said cylinders being provided with integral heads at their lower ends and having removable heads at their upper ends provided with ports, pistons located within the cylinders, piston rods connected with the pistons and extending through the upper heads, a horizontal bar connecting the upper terminals of the piston rods to cause the same to move in unison, said bar having spaced lugs formed on its under side to provide means for attaching it to a vehicle body, a vertically substantially inverted U-shaped pipe located between said cylinders and connected at its terminals with the said cylinders at the lower ends of the same for equalizing the pressure in the cylinders below the pistons, and permitting an uninterrupted passage of the same from one cylinder to the other, and a valve at the top of the pipe for supplying fluid pressure to the cylinders, said pipe being arranged to straddle the axle supporting the valve above the same.

In testimony whereof I affix my signature in presence of two witnesses.

JOHN W. MATTHEWS.

Witnesses:
R. WHITE,
H. F. PIKE.

Copies of this patent may be obtained for five cents each, by addressing the "Commissioner of Patents, Washington, D. C."